United States Patent
Berens

(10) Patent No.: US 7,726,746 B2
(45) Date of Patent: Jun. 1, 2010

(54) HUBCAP HAVING LIGHTED SPINNING ELEMENT

(76) Inventor: Martin C. Berens, 2659 W. Kemper Rd., Cincinnati, OH (US) 45231

( * ) Notice: Subject to any disclaimer, the term of this patent is extended or adjusted under 35 U.S.C. 154(b) by 136 days.

(21) Appl. No.: 11/845,890

(22) Filed: Aug. 28, 2007

(65) Prior Publication Data
US 2009/0058177 A1    Mar. 5, 2009

(51) Int. Cl.
*B60B 7/20* (2006.01)
(52) U.S. Cl. .............................. 301/37.25; 301/37.108; 362/500
(58) Field of Classification Search ............. 301/37.25, 301/37.108, 37.109; 362/500; 40/587
See application file for complete search history.

(56) References Cited

U.S. PATENT DOCUMENTS

| | | | |
|---|---|---|---|
| 3,528,705 A | 9/1970 | Oldroyd | |
| 4,388,771 A | 6/1983 | Lalonde | |
| 4,562,516 A * | 12/1985 | Chastain | .................... 362/500 |
| 5,316,376 A | 5/1994 | Defreitas | |
| 5,497,302 A * | 3/1996 | O'Donnell | .................. 362/500 |
| 5,876,108 A * | 3/1999 | Chien | .......................... 362/35 |
| 5,903,224 A * | 5/1999 | Reynolds | ............... 340/815.45 |
| 6,175,196 B1 * | 1/2001 | Ragner et al. | ........... 315/200 A |
| 6,936,980 B2 * | 8/2005 | Wang | ......................... 315/292 |
| 7,150,549 B2 * | 12/2006 | Olds et al. | .................... 362/500 |
| 2005/0099820 A1* | 5/2005 | Cooper | ....................... 362/500 |
| 2005/0140201 A1* | 6/2005 | Wang | ..................... 301/37.101 |
| 2005/0206218 A1* | 9/2005 | Clifford et al. | ........... 301/37.25 |

* cited by examiner

*Primary Examiner*—Russell D Stormer
(74) *Attorney, Agent, or Firm*—Dale J. Ream

(57) ABSTRACT

A hubcap device for use with a wheel includes a base and a fastener for coupling the base to the wheel. The hubcap device includes a spinner member between the base and the cover, the spinner member having a light element. The hubcap device includes a battery for powering the light element and a processor for actuating the light element. An insert is removably coupled to the cover, the spinner member being positioned between the insert and the base. The hubcap device may include a photocell in communication with the processor, the processor including programming to actuate the light element in predetermined light conditions. The device includes an optical sensor coupled to the spinner member to measure a rotational speed of the spinner member relative to a rotational speed of the base, the optical sensor providing a relative rotational speed measurement to said processor.

1 Claim, 6 Drawing Sheets

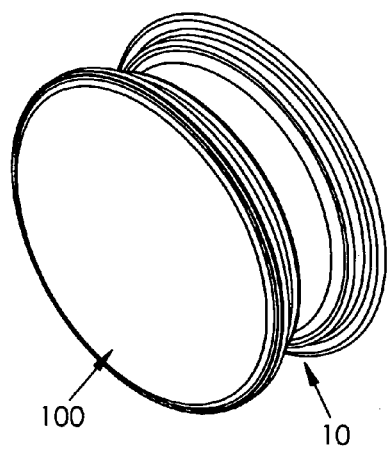
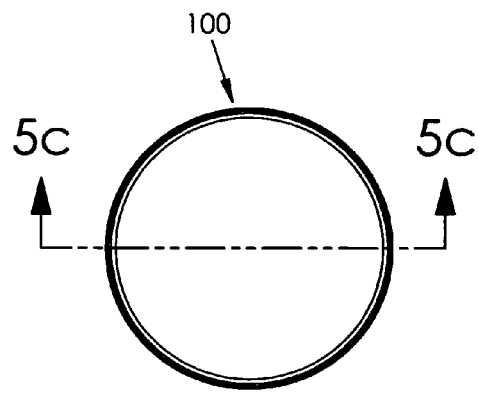
Fig. 5a　　　　　　　　Fig. 5b
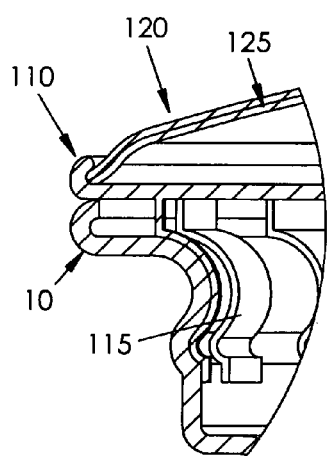
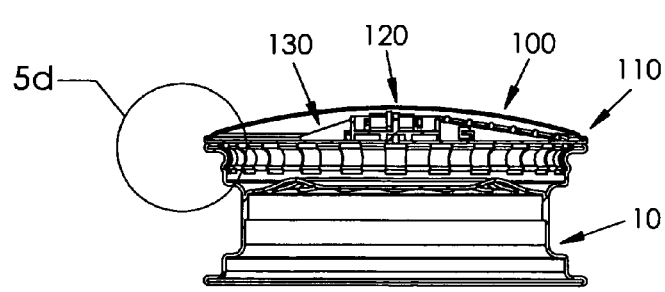
Fig. 5d　　　　　　　　Fig. 5c

HUBCAP HAVING LIGHTED SPINNING ELEMENT

BACKGROUND OF THE INVENTION

This invention relates generally to automobile hubcaps and, more particularly, to a hubcap device that enables the vehicle to be personalized by receiving picture inserts and including lighting features dependent on ambient light conditions and vehicle motion.

Vehicle customization has become very popular as a means of personal expression. Personalized tags, bumper stickers, painting, decals, collectible license plates, or other ornamental devices are all ways in which a vehicle owner may demonstrate his personality and individuality. However, displaying pictures, posters, or other generally opaque images upon a vehicle's windows may be unsafe and displaying them on the surface of the vehicle may cause damage to the finish.

Various devices have been proposed in the art for inserting pictures into a vehicle wheel hubcap so that the picture may be viewable as the vehicle is driven. Although assumably effective for their intended purposes, the existing devices and proposals are not useful for many varieties of vehicle wheels, are not user-friendly for interchanging picture inserts, or do not provide appropriate lighting for various ambient lighting situations.

Therefore, it would be desirable to have a hubcap device into which desired pictures or images may be inserted interchangeably for attachment to vehicle wheel. Further, it would be desirable to have a hubcap device having a backlighting feature so that the picture may be viewed in dim or dark lighting conditions. Still further, it would be desirable to have a hubcap device that spins upon vehicle motion and varies the spinning and lighting features depending on motion and ambient lighting conditions.

SUMMARY OF THE INVENTION

Accordingly, a hubcap device for use with a wheel according to the present invention includes a base and at least one fastener for coupling the base to the wheel. A cover may be removably coupled to the base and may be partially transparent in construction. The hubcap device includes a spinner member between the base and the cover, the spinner member having a light element and being rotatably coupled to at least one of the base or the cover. The hubcap device includes a battery for powering the light element and a processor for actuating the light element. An insert is removably coupled to the cover, the spinners member being positioned between the insert and the base.

Further, the hubcap device may include a photocell in communication with the processor to provide the processor with data corresponding to ambient light conditions, and wherein the processor includes programming to actuate the light element only in predetermined light conditions. In addition, the hubcap device may include an optical interrupter coupled to the base or the cover. It may also include an optical sensor coupled to the spinner member to measure a rotational speed of the spinner member relative to a rotational speed of the base by detecting the optical interrupter, the optical sensor providing a relative rotational speed measurement to the processor. The processor includes programming to actuate the light element only upon receiving predetermined relative rotational speed measurements.

Therefore, a general object of this invention is to provide a hubcap device for use with a vehicle wheel for displaying a picture or image.

Another object of this invention is to provide a hubcap device, as aforesaid, in which the picture spins during vehicle motion.

Still another object of this invention is to provide a hubcap device, as aforesaid, in which the picture is illuminated when predetermined ambient lighting conditions are detected.

Yet another object of this invention is to provide a hubcap device, as aforesaid, that may be removably attached to an automobile wheel.

A further object of this invention is to provide a hubcap device, as aforesaid, in which the intensity of the light is increased with an increase in the rotational speed of the wheel.

A still further object of this invention is to provide a hubcap device, as aforesaid, that is user-friendly to use and cost effective to manufacturer.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 3b is a sectional view taken along line 3b-3b of FIG. 3a;

FIG. 4b is sectional view taken along line 4b-4b of FIG. 4a;

FIG. 5a is a perspective view of the hubcap device attached to a wheel;

FIG. 5b is a top view of the hubcap device and wheel as in FIG. 5b;

FIG. 5c is a sectional view taken along line 5c-5c of FIG. 5b;

FIG. 5d is an isolated view on an enlarged scale taken from FIG. 5c; and

DESCRIPTION OF THE PREFERRED EMBODIMENT

Figure 1:
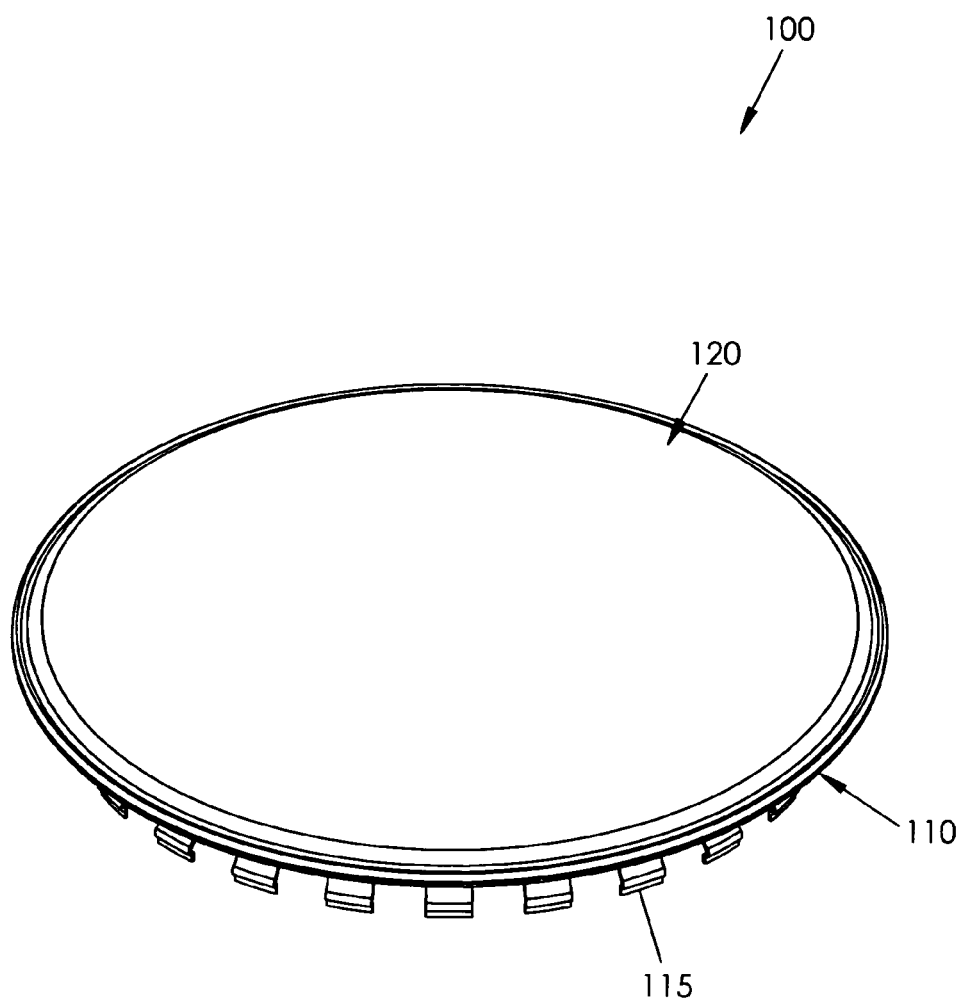
FIG. 1 is a perspective view of a hubcap device according to a preferred embodiment of the present invention.

A hubcap device 100 according to the present invention will now be described in detail with reference to FIGS. 1 through 6 of the accompanying drawings. More particularly, according to the current invention, a hubcap device 100 for use with a wheel 10 (e.g., a vehicle wheel) includes a base 110, a cover 120, and a spinner member 130.

As shown in FIGS. 5c and 5d, the base 110 may have a configuration that allows the base 110 to generally cover the wheel 10 when placed adjacent the wheel 10. The base 110 may be constructed of any appropriate material, such as metal or plastic, for example, any may be any color. It is currently preferred that the base 110 be white or another reflective color for reasons discussed below, though other colors would also be appropriate.

Means for attaching the base 110 to the wheel 10 are included. More particularly, at least one fastener may couple the base 110 to the wheel 10. A fastener that does not require a special wheel 10 and that does not damage the wheel 10 (such as clips 115 shown in FIGS. 1 and 5b) may be preferred, though other fasteners could alternately, or additionally, be used. Appropriate fasteners include, for example, the clips 115, bolts, threads, adhesive, and welding.

Figure 2:
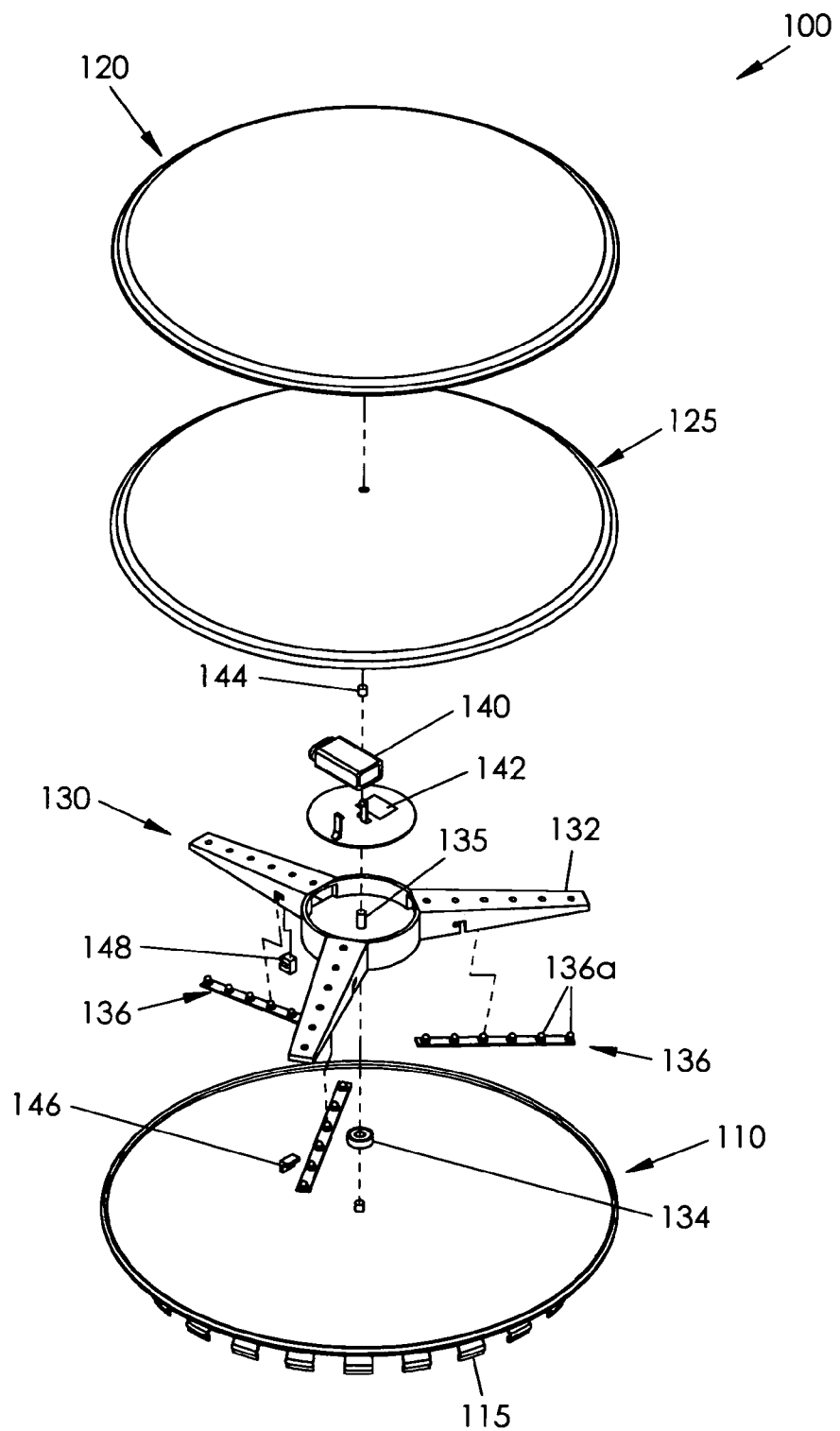
FIG. 2 is an exploded view of the hubcap device as in FIG. 1.
Figure 3A:
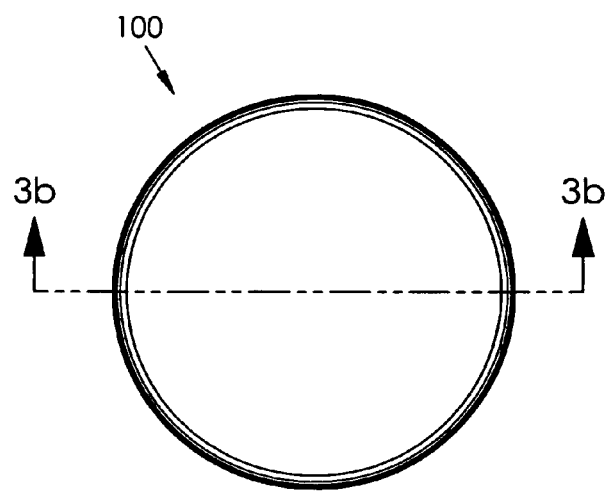
FIG. 3a is a top view of the hubcap device as in FIG. 1.
Figure 3C:
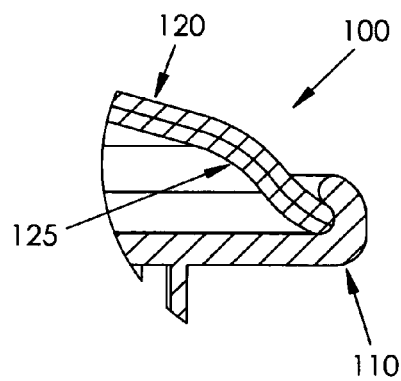
FIG. 3c is an isolated view on an enlarged scale taken from FIG. 3b.
Figure 3B:
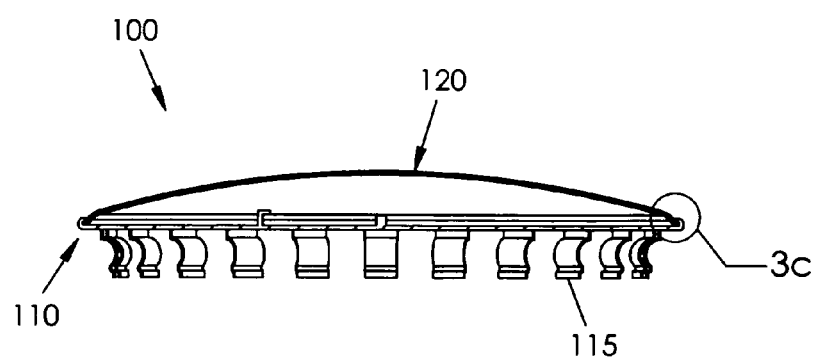

The cover 120 is coupled to the base 110 in either a permanent or removable manner. As shown in FIG. 3c, the cover 120 may, for example, be resilient and have a configuration that is complementary to a configuration of the base 110 so that the cover 120 effectively "snaps" inside the base 110. The cover 120 may be at least partially transparent and may be constructed of a scratch-resistant clear plastic or any other appropriate material. As shown in FIGS. 2 and 3c, an insert 125 having indicia may be removably coupled to the cover 120. The insert 125 may be at least partially transparent and may be constructed of a translucent plastic or any other appropriate material. Including multiple inserts 125 may allow the indicia to be inexpensively changed by replacing one insert 125 with another having different indicia. Particularly if an insert 125 is not included, the cover 120 may include indicia that will be backlit as further discussed below.

Figure 4A:
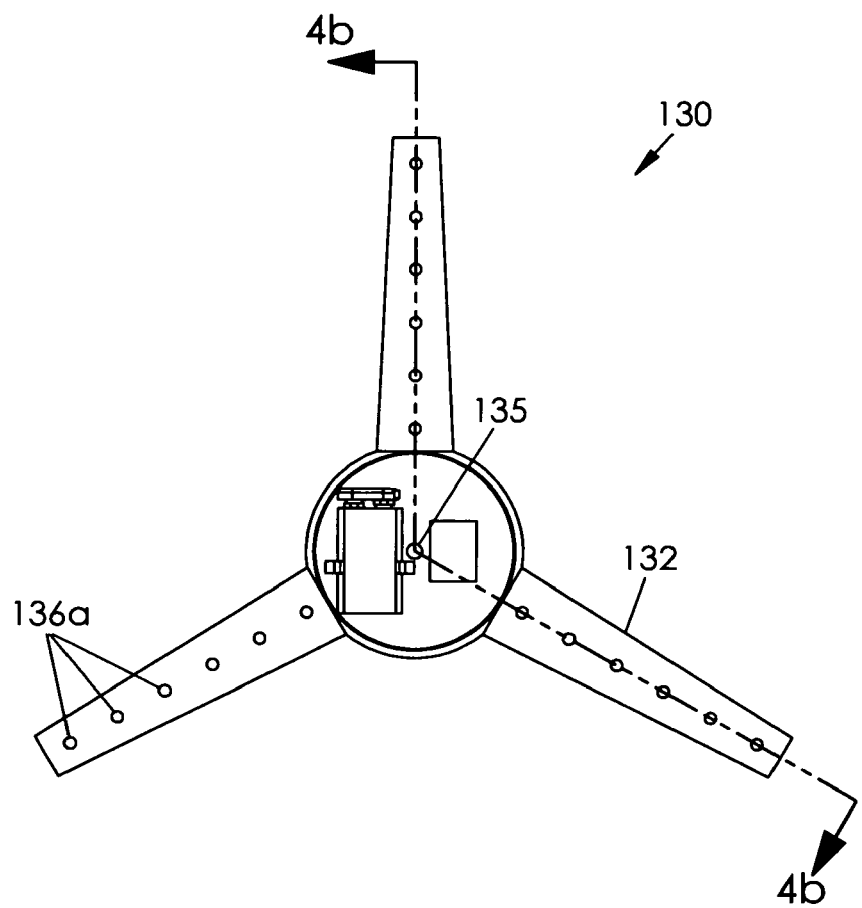
FIG. 4a is a top view of a spinner device of the hubcap device as in FIG. 2.
Figure 4B:
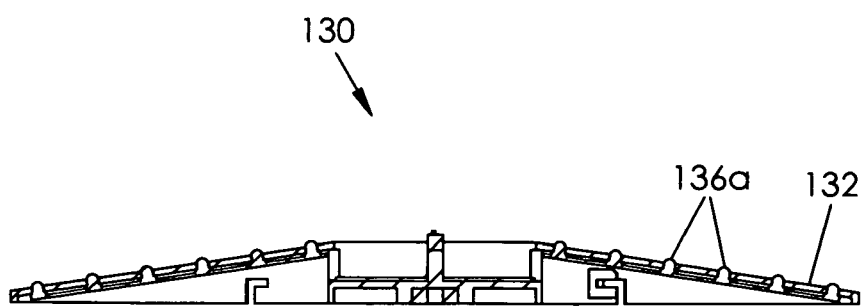

FIGS. 2, 4a, 4b, and 5c show the spinner member 130. As shown in FIG. 2, the spinner member 130 is between the base 110 and the cover 120 (and between the base 110 and the insert 125 if the insert 125 is utilized). The spinner member 130 has an axis of rotation 135 and may include a plurality of arms 132 radiating outwardly from the axis of rotation 135, as shown in FIGS. 2 and 4a. The spinner member 130 is rotatably coupled to the base 110 and/or the cover 120, and a bearing 134 (FIG. 2) may be used to reduce friction between the spinner 130 and the base 110 or the cover 120. FIG. 2 shows the spinner member 130 rotatably coupled to the base 110 along the axis of rotation 135 utilizing the bearing 134.

A light element 136, (e.g., a LED, an incandescent light bulb, a fluorescent light, etc.) may be included with the spinner member 130. The hubcap device 100 shown in FIGS. 2 and 4a has three light elements 136 consisting of LED 136a arrays coupled to the spinner arms 132 so that the LED arrays radiate outwardly along with the arms 132.

Figure 6:
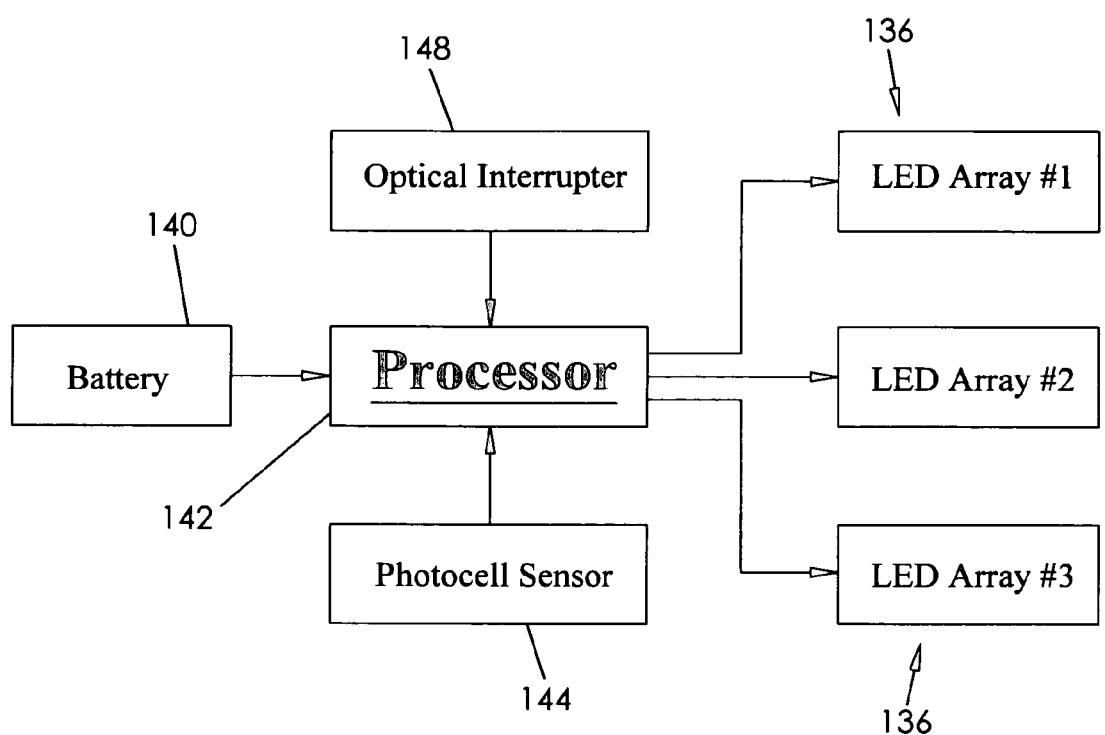
FIG. 6 is a block diagram illustrating the electronic components of the present invention.

As shown in FIGS. 2 and 6, a battery 140 is included to power the light element(s) 136, and a processor 142 is included to actuate the light element(s) 136. The battery 140 and the processor 142 may be coupled to the spinner member 130, as also shown in FIGS. 2 and 6.

A photocell 144 (FIGS. 2 and 6) may be in communication with the processor 142 to actuate the light element(s) 136 only in predetermined light conditions. More particularly, the photocell 144 may provide the processor 142 with data corresponding to light conditions (i.e., ambient light conditions), and the processor 142 may include programming to actuate the light element(s) 136 only in predetermined light conditions. For example, the processor may not actuate the light element(s) 136 in daylight or in otherwise light environments.

Means for measuring a rotational speed of the spinner member 130 relative to a rotational speed of the base 110 and providing a measurement to the processor 142 may be included, and the processor 142 may include programming to actuate the light element(s) 136 only upon receiving predetermined measurements (i.e., predetermined relative rotational speed measurements). For example, an optical interrupter 146 may be coupled to the base 110 and/or the cover 120, and an optical sensor 148 may be coupled to the spinner member 130 to measure the rotational speed of the spinner member 130 relative to the rotational speed of the base 110 by detecting the optical interrupter 146. The optical sensor 148 may then provide the relative rotational speed measurement to the processor.

In use, an insert 125 may be coupled to the cover 120, and the cover 120 may be coupled to the base 110, as shown in FIGS. 2 and 3c and discussed above. The base 110 may be coupled to the wheel 10, such as by the clips 115 as shown in FIG. 5d. The processor 142 may actuate the light element(s) 136 to backlight the indicia on the insert 125. If the insert 125 is not used, indicia on the cover 120 may be backlit. Coloring the base 110 white or another reflective color as noted above may increase the intensity of the light from the light element(s) 136 that exits the cover 120.

If the photocell 144 is included, the photocell 144 may provide the processor 142 with data corresponding to ambient light conditions, and the processor 142 may utilize that data to actuate the light element(s) 136 only when the amount of ambient light is below a predetermined threshold.

If the optical sensor 148 and the optical interrupter 146 are included, the processor 142 may actuate the light element(s) 136 only when the spinner member 130 rotates relative to the base 110 at predetermined speeds. Relative rotational speed may be determined by the optical sensor 148 as set forth above. When the wheel 10 attached to the hubcap device 100 begins rotating, the spinner member 130 may remain relative stationary, which causes the relative rotational speed measurement to increase. Eventually, the spinner member 130 may rotate at the same or nearly the same speed as the wheel 10 (such as when the vehicle is traveling at a constant speed on a highway), which decreases the relative rotational speed measurement. The processor 142 may, for example, actuate the light element(s) 136 only during predetermined rotational speeds (including predetermined changes in rotational speeds) that generally correspond to the vehicle accelerating and decelerating; this may conserve the battery 140 by keeping the light element(s) 136 from being actuated when a vehicle is traveling at a constant speed on a highway or parked for extended periods of time.

It is understood that while certain forms of this invention have been illustrated and described, it is not limited thereto except insofar as such limitations are included in the following claims and allowable functional equivalents thereof.

The invention claimed is:

1. A hubcap device for use with a vehicle wheel, said hubcap device comprising:
   a base;
   at least one fastener to couple said base to said wheel;
   a cover coupled to said base;
   a spinner member between said base and said cover, said spinner member having a light element and being rotatably coupled to at least one of said base or said cover;
   a battery for powering said light element;
   a processor for actuating said light element;
   a plurality of inserts, each insert having indicia different than indicia on any other of said plurality of inserts;
   wherein:
      said cover is removably coupled to said base;
      a respective insert is removably coupled to said cover, said spinner member being between said respective insert and said base;
      said cover is at least partially transparent;
      each of said plurality of inserts is at least partially transparent;
   a photocell in communication with said processor to provide said processor with data corresponding to ambient light conditions, and wherein said processor includes programming to actuate said light element only in predetermined light conditions;
   an optical interrupter coupled to one of said base and said cover;

an optical sensor coupled to said spinner member to measure a rotational speed of said spinner member relative to a rotational speed of said base by detecting said optical interrupter, said optical sensor providing a relative rotational speed measurement to said processor; and wherein said processor includes programming to actuate said light element only upon receiving predetermined relative rotational speed measurements;

wherein:

said battery and said processor are coupled to said spinner member;

said spinner member has an axis of rotation;

said spinner member has a plurality of arms radiating outwardly from said axis of rotation; and said light element is a LED array coupled to a respective said arm to radiate outwardly from said axis of rotation.

* * * * *